United States Patent [19]

Leksell et al.

[11] Patent Number: 5,227,769
[45] Date of Patent: Jul. 13, 1993

[54] HEADS-UP PROJECTION DISPLAY

[75] Inventors: David Leksell, Oakmont, Pa.; George F. Mechlin, Aptos, Calif.; Zoltan K. Kun, Pittsburgh, Pa.

[73] Assignee: Westinghouse Electric Corp., Pittsburgh, Pa.

[21] Appl. No.: 704,515

[22] Filed: May 23, 1991

[51] Int. Cl.⁵ .................................. G09G 3/02
[52] U.S. Cl. ................... 340/705; 340/980; 359/630
[58] Field of Search ......... 340/705, 781, 980; 359/630; 358/104

[56] References Cited

U.S. PATENT DOCUMENTS

| | | | |
|---|---|---|---|
| 3,851,304 | 11/1974 | Picardat | 359/630 |
| 3,923,370 | 12/1975 | Mostrom | 359/630 |
| 4,093,347 | 6/1978 | La Russa | 359/630 |
| 4,347,508 | 8/1982 | Spooner | 340/705 |
| 4,361,384 | 11/1982 | Bosserman | 359/630 |
| 4,424,523 | 1/1984 | Snelling et al. | 346/160 |
| 4,535,341 | 8/1985 | Kun et al. | 346/107 |
| 4,734,723 | 3/1988 | Ishitobi | 346/160 |
| 4,807,047 | 2/1989 | Sato et al. | 358/300 |
| 4,830,464 | 5/1989 | Cheysson et al. | 340/705 |
| 4,885,448 | 12/1989 | Kasner et al. | 219/121 |
| 4,899,184 | 2/1990 | Leksell et al. | 346/155 |
| 4,902,082 | 2/1990 | Okabayashi et al. | 340/705 |
| 4,928,118 | 5/1990 | Leksell et al. | 346/107 |
| 4,947,160 | 8/1990 | Leksell et al. | 340/805 |
| 4,951,064 | 8/1990 | Kun et al. | 346/107 |
| 4,975,691 | 12/1990 | Lee | 340/781 |

OTHER PUBLICATIONS

"Design Case Study: Private Eye", *Information Display*, vol. 6, No. 3, pp. 8-11, 1990.

*Primary Examiner*—Ulysses Weldon
*Assistant Examiner*—Regina Liang
*Attorney, Agent, or Firm*—T. H. Martin

[57] ABSTRACT

A projection apparatus is provided which produces a heads-up display in a helmet of the type commonly worn by a pilot. The projection apparatus includes a thin-film electroluminescent source having an edge emitter device provided therein. The edge emitter produces a linear signal which is transversely deflected by a scanner to produce an image on a display area. Preferably, the display area is provided on the face plate of a helmet worn by the pilot.

1 Claim, 2 Drawing Sheets

HEADS-UP PROJECTION DISPLAY

BACKGROUND OF THE INVENTION

1. Field of the Invention

This invention relates to the field of projection devices and more particularly to the field of heads-up displays for use in helmets. More particularly, the present invention relates to the field of projection devices in small, lightweight helmets for use by pilots which use edge emitting devices provided on thin film electroluminescent sources.

2. Description of the Prior Art

The utilization of a projection device such as a heads-up display in a helmet, is well known in the prior art. Such projection devices are typically used to transmit information to the pilot of an aircraft, especially a military aircraft, regarding flight instructions, flight conditions, and the location of other aircraft, targets, and landing facilities.

One of the advantages of a heads-up display is its ability to permit the pilot to perform two functions at the same time. The pilot can continuously view information presented by the heads-up display. At the same time, the pilot can look through the heads-up display to read the controls on the operating panel or visually examine conditions outside the aircraft by looking out the cockpit window.

Although heads-up displays offer many advantages to the pilot, the mechanisms for creating the display are often times heavy and bulky. When the heads-up display is applied to a helmet, the helmet necessarily becomes larger and heavier. Such helmets are frequently awkward to wear and may provide an unacceptable stress on the pilot's neck. Consequently, there is a need for a heads-up display projection device for use in a helmet which is small and lightweight so as to minimize these potential problems to the wearer.

The military presently uses pilot helmets that incorporate a one square inch CRT screen that can be placed in front of one of the pilot's eyes to provide vast quantities of information for the safe and proper operation of the aircraft. A significant drawback to the use of a CRT screen in the helmet is that it is heavy and needs a 1000-volt power supply for its operation. This makes the helmets bulky.

Means for providing the pilots the same or more information in a lighter weight packaging is needed. The improved heads-up display should include use of a transparent screen enabling the pilots to perceive all the necessary information transmitted on the screen without detracting from the pilot's ability to see from the aircraft itself.

SUMMARY OF THE INVENTION

A projection apparatus which produces a heads-up display in a helmet is provided which utilizes a thin-film electroluminescent source (TFEL) to produce the light signal which creates the display. An edge emitter device provided in the TFEL produces a linear light signal which is transversely scanned over a designated area in the heads-up display. Preferably, the linear light signal is scanned over a designated area of a transparent face shield of the pilot's helmet.

In order to produce an image on the designated area, both the transparent surface of the face shield and the edge emitter signal may be polarized. Alternatively, the transparent surface may be coated or otherwise treated to enhance the reflectivity of the image produced by the transverse scanning of the linear light signal. Finally, the transversely scanned linear light signal may be directed on the transparent surface at an appropriate angle to produce a visible image thereon.

Various alternative means are proposed to enable the linear light signal to be transversely scanned over the designated area of the transparent face shield. First, an elliptical mirror may be provided intermediate the TFEL and the transparent face shield. Drive means connected to the elliptical mirror rotate the mirror, thereby directing the scanned linear light signal across a designated area of the transparent face shield. Alternatively, an oscillating flat mirror may be provided intermediate the TFEL and the transparent face shield. Such an oscillating mirror deflects the scanned linear light signal across designated area of the transparent face shield. Finally, means may be provided to oscillate the TFEL itself, thereby transversely directing the scanned linear light signal across the designated area of the transparent face shield.

DESCRIPTION OF THE PREFERRED EMBODIMENTS

Figure 1:
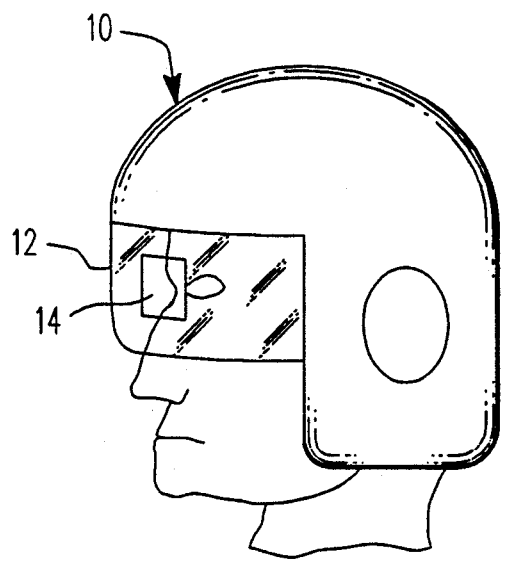
FIG. 1 is a diagrammatic representation of a helmet used with the present invention.

FIG. 1 shows a helmet 10 for use by pilots. Helmet 10 is adapted to receive the heads-up projection display apparatus of the present invention. Helmet 10 includes face plate portion 12 through which the pilot views his controls and looks out the cockpit window. Face plate 12 should be formed of a transparent material. A portion 14 of face plate 12 is adapted to display the heads-up image. That portion, display area 14, is adapted to display the heads-up image for viewing by the pilot.

Display area 14 may be specially adapted to display the heads-up display image. The display area 14 may be coated with a material which will reflect the heads-up display image. Such a coating should not obscure the vision of the pilot looking through the face plate 12. Alternatively, the surface of display area 14 may be treated to form a screen for the heads-up display. In a third alternative for displaying the heads-up image, display area 14 is formed from a polarized material which will cooperate with the heads-up display image to produce an image. In this regard, the entire face plate 12 may be formed of a polarized material with only display area 14 being subjected to the heads-up display signal. Finally, the heads-up display signal may be directed at a particular angle with respect to display area 14 to produce a reflected image thereon.

Figure 2:
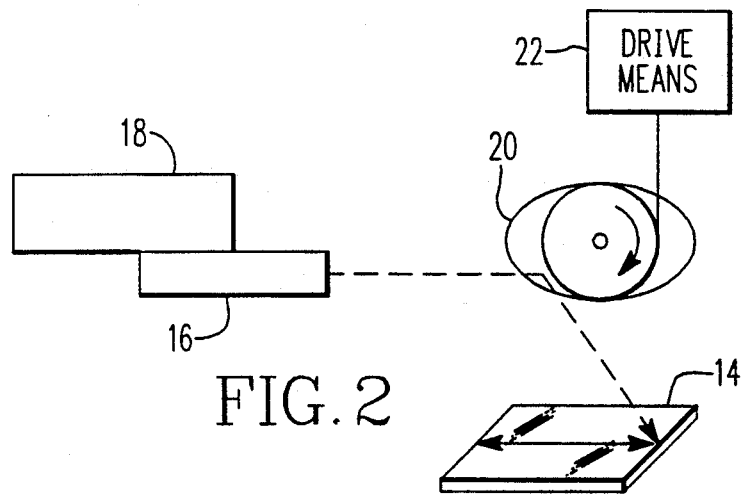
FIG. 2 is a diagrammatic representation of a first presently preferred embodiment of the projection device for use in a helmet according to the present invention.
Figure 3:
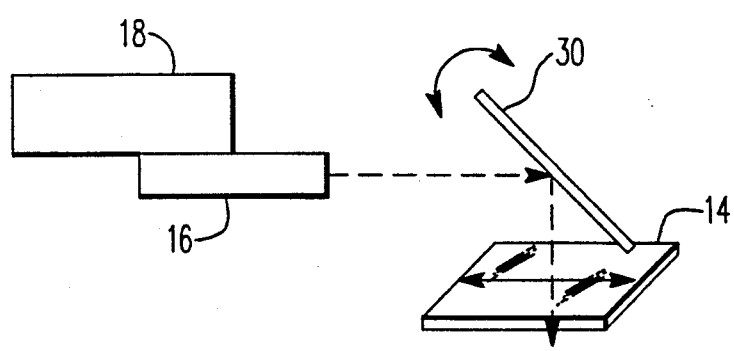
FIG. 3 is a diagrammatic representation of a second presently preferred embodiment of the projection device for use in a helmet according to the present invention.
Figure 4:
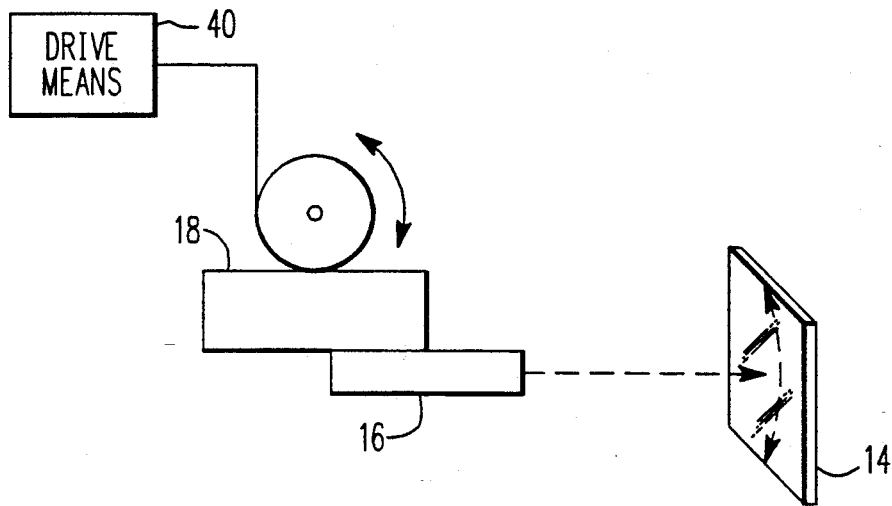
FIG. 4 is a diagrammatic representation of a third presently preferred embodiment of the projection device for use in a helmet according to the present invention.

As shown in FIGS. 2, 3, and 4, the heads-up projection display apparatus includes an edge emitter 16 of a thin film electroluminescent (TFEL) means connected to a power logic circuit 18. The edge emitter 16 produces a linear light signal. Power logic circuit 18 controls the TFEL edge emitter 16 and directs edge emitter 16 to produce specified linear light signals. Preferably, power logic circuit 18 contains similar electronic components as are found in an integrated circuit. The signal produced by edge emitter 16 is directed to display area 14 to form a heads-up display which can be seen by the pilot wearing the helmet 10. Because edge emitter 16 produces a linear light signal, means must be provided in helmet 10 for transversely scanning the linear light signal produced by edge emitter 16 over display area 14. If edge emitter 16 produces a horizontally linear light signal as viewed on display area 14, the scanning means must operate vertically to produce a two-dimensional image on display area 14.

In the embodiment shown in FIG. 2, the scanning means includes an elliptical mirror 20 which is connected to a drive means 22. Drive means 22 rotates the elliptical mirror 20, thereby transversely deflecting the signal produced by edge emitter 16 over display area 14. Logic circuit 18, elliptical mirror 20 and drive means 22 are operationally coordinated to produce the desired image on display area 14.

In the embodiment of FIG. 3, flat mirror 30 is interposed between edge emitter 16 and display area 14. Drive means 32 which is operatively connected to flat mirror 30 oscillates flat mirror 30. The oscillation of mirror 30 causes the linear light signals produced by edge emitter 16 to be transversely scanned over display area 14.

Figure 5:
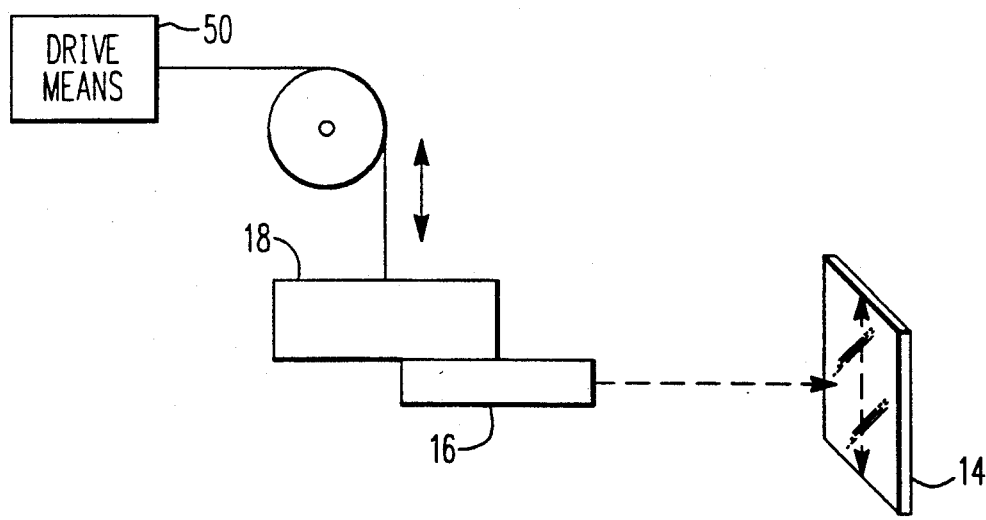
FIG. 5 is a diagrammatic representation of a fourth presently preferred embodiment of the projection device for use in a helmet according to the present invention.

In the embodiment shown in FIG. 4, drive means 40 oscillates the TFEL edge emitter 16. By oscillating edge emitter 16, the linear light signal produced by emitter 16 is transversely scanned over display area 14. In this manner, a heads-up display image is produced on display area 14. FIG. 5 shows a further embodiment in which drive means 50 vertically repositions edge emitter 16 while maintaining its directional attitude constant.

In each of the embodiments of FIGS. 2, 3, 4 and 5, the scanning means cooperates with the edge emitter 16. Edge emitter 16 produces a linear light signal and the scanning means creates a two-dimensional image by transversely scanning the linear light signal over the display area 14.

An advantage of the present heads-up display apparatus is the ability to produce multiple color images. Based on thin film electroluminescence technology, different color outputs are possible. An individual edge emitter 16 can produce a single multi-color array. A single array can contain multiple color emitters side by side or multiple color arrays can be stacked upon one another in a single head. The various colors which can be produced include white, red, blue and green.

The present heads-up display apparatus projection device provides a smaller, lighter weight helmet for pilots. The heads-up display provides the information on a superior screen compared to prior art devices. The heads-up display is capable of being seen through and have superior resolution quality than existing devices presently used to keep pilots informed.

In a heads up display, a display area 14 of one square inch is preferred. Because of the proximity of display area 14 to the pilot's eye, the one square inch display image covers the full spectrum that one would normally see on a much larger screen. In such a flat panel display, the minimum required light intensity is approximately 20 ft. lamberts.

Edge emitter 16 produces an extremely high intensity narrow band of light. The average brightness level of commercial edge emitters 16 is approximately 2000 ft. lamberts. In measuring the light intensity, a fill factor of 70 is used. This fill factor of 70 indicates that an area 70 times larger than what is actually producing the light is being measured. The actual light emission of a commercial edge emitter 16 is thus approximately 140,000 ft. lamberts. Using the straight conversion of 140,000 ft. lamberts divided by the required minimum 20 ft. lamberts yields a result of 7000. Thus, an edge emitter strip one micron thick produces an image 7000 microns thick having the desired light intensity. Because there are 25,400 microns per inch, a heads-up display using a commercial emitter produces an image having an intensity of 20 ft. lamberts over a length of about ⅓ inch.

The projection device with TFEL edge emitter 16 needs to be three times brighter than existing commercial edge emitters to cover the preferred one square inch display panel. Although no such commercial devices presently exist, the technology to achieve this increased brightness is presently available.

The projection device with TFEL edge emitter 16 may be provided on a silicon wafer with all the addressing electronics printed on the wafer itself. This eliminates the need for a separate circuit 18. The silicon wafer has a linear array one inch long. Technology presently exists for providing a 1 micron geometry on a silicon wafer. Consequently, there is a potential of putting 12,000 (1 micron × 1 micron) line pairs on the linear array of the silicon wafer. This provides an extremely high resolution, much higher than needed for a projection system. Only 1000 dots per inch are needed for the preferred resolution, as this would provide 1,000,000 addressable pixels in the one square inch display area 14.

While we have described present preferred embodiments of the invention, it is to be distinctly understood that the invention is not limited thereto but may be otherwise embodied and practiced within the scope of the following claims.

We claim:

1. A projection apparatus for providing a heads-up display in a helmet comprising:
    a thin-film electroluminescent edge emitter which produces a linear output;
    an oscillating flat mirror operatively connected to said thin-film electroluminescent edge emitter;
    drive means connected to said flat mirror to oscillate said mirror wherein said oscillation of said mirror transversely deflects said linear output across a designated area of a transparent surface;
    said transparent surface provided in said helmet, said transparent surface adapted to receive said transversely deflected linear output and display an image; and
    a power logic circuit operatively connected to said thin-film electroluminescent edge emitter for controlling the production of said linear output.

* * * * *